United States Patent
Creta et al.

(10) Patent No.: US 6,915,365 B2
(45) Date of Patent: Jul. 5, 2005

(54) MECHANISM FOR PCI I/O-INITIATED CONFIGURATION CYCLES

(75) Inventors: Kenneth C. Creta, Gig Harbor, WA (US); Doug Moran, Folsom, CA (US); Vasudevan Shanmugasundaram, Tumwater, WA (US)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 10/104,814

(22) Filed: Mar. 22, 2002

(65) Prior Publication Data

US 2003/0182482 A1 Sep. 25, 2003

(51) Int. Cl.[7] .............. G06F 13/00; G06F 3/00; G06F 13/36
(52) U.S. Cl. ............ 710/104; 710/10; 710/314
(58) Field of Search ................ 710/104, 314, 710/306, 300, 301, 10, 1–2, 17; 709/220–222

(56) References Cited

U.S. PATENT DOCUMENTS

| | | | |
|---|---|---|---|
| 1,824,352 A | 9/1931 | Isaacs ............... | 70/161 |
| 2,131,243 A | 9/1938 | Whitaker ............ | 70/165 |
| 3,537,283 A | 11/1970 | Mross ............... | 70/164 |
| 3,915,335 A | 10/1975 | Shanklin et al. ..... | 220/303 |
| 3,998,353 A | 12/1976 | Farelli ............. | 220/210 |
| 4,028,914 A | 6/1977 | Saele et al. ........ | 70/165 |
| 4,064,717 A | 12/1977 | Neiman .............. | 70/165 |
| 4,107,960 A | 8/1978 | Neiman .............. | 248/165 |
| 4,143,530 A | 3/1979 | Murtezov et al. ..... | 70/165 |
| 4,317,345 A | 3/1982 | Hinson .............. | 70/170 |
| 4,362,035 A | 12/1982 | Vitale .............. | 70/165 |
| 4,795,054 A | 1/1989 | Brown ............... | 220/304 |
| 4,809,870 A | 3/1989 | Goodall ............. | 220/288 |
| 4,984,698 A | 1/1991 | Stuckey ............. | 215/207 |
| 4,986,097 A | 1/1991 | Derman .............. | 70/158 |
| 5,467,621 A | 11/1995 | Gravino ............. | 70/171 |
| 5,737,524 A | * 4/1998 | Cohen et al. ........ | 710/301 |
| 5,737,542 A | * 4/1998 | Kurihara et al. ..... | 710/301 |
| 5,845,800 A | 12/1998 | Shaw et al. ......... | 220/210 |
| 6,311,296 B1 | * 10/2001 | Congdon ............ | 714/56 |
| 6,574,695 B1 | * 6/2003 | Mott et al. ......... | 710/302 |
| 2003/0037199 A1 | * 2/2003 | Solomon et al. ...... | 710/314 |

OTHER PUBLICATIONS

PCI Special Interest Group, *PCI–toPCI Bridge Architecture Specification*, Rev. 1.1, Dec. 18, 1998, pp. 2–24.
PCI Special Interest Group, *PCI Local Bus Specification*, Revision 2.3, Oct. 31, 2001, pp. ii–viii, 21–112, 207–208, 218.

* cited by examiner

Primary Examiner—Glenn A. Auve
Assistant Examiner—Nimesh Patel
(74) Attorney, Agent, or Firm—Marger Johnson & McCollom, P.C.

(57) ABSTRACT

Methods and apparatus for inbound PCI configuration cycles are disclosed. By definition, PCI bridges block upstream progress of configuration cycles initiated by a PCI bus master on their secondary buses. In the described embodiments, a PCI bus master can execute a configuration cycle despite this limitation, by converting the configuration cycle command to Memory Read and Write commands that a PCI bridge will forward upstream. The PCI bus master writes the address of a target configuration register to a first predefined address, and pushes or pulls data from that target register by subsequently initiating a memory access to a second predefined address. A platform chipset is designed to recognize Memory Read and Write accesses to the predefined addresses as relating to an inbound configuration cycle. When a memory access to the second address is received, the chipset uses the information stored at the first address to form and execute a configuration cycle on behalf of the downstream PCI bus master.

27 Claims, 11 Drawing Sheets

Fig. 3a (Prior Art)

| 31 | 16 15 | 11 10 8 | 7 | 2 | 1 | 0 |
|---|---|---|---|---|---|---|
| Reserved (Device No. Represented as a "1" in one corresponding bit place for Host Bridge translation) | Reserved | Function Number | Register Number | | 0 | 0 |

Type 0 Configuration Transaction Address Phase Format

Fig. 3b (Prior Art)

| 31 | 24 23 | 16 15 | 11 10 8 | 7 | 2 | 1 | 0 |
|---|---|---|---|---|---|---|---|
| Reserved | Bus Number | Device Number | Function Number | Register Number | | 0 | 1 |

Type 1 Configuration Transaction Address Phase Format

Fig. 3c (Prior Art)

| 31 30 | 24 23 | 16 15 | 11 10 8 | 7 | 2 | 1 | 0 |
|---|---|---|---|---|---|---|---|
| ↑ Reserved | Bus Number | Device Number | Function Number | Register Number | | 0 | 0 |

Enable Bit

CONFIG_ADDRESS Register Format

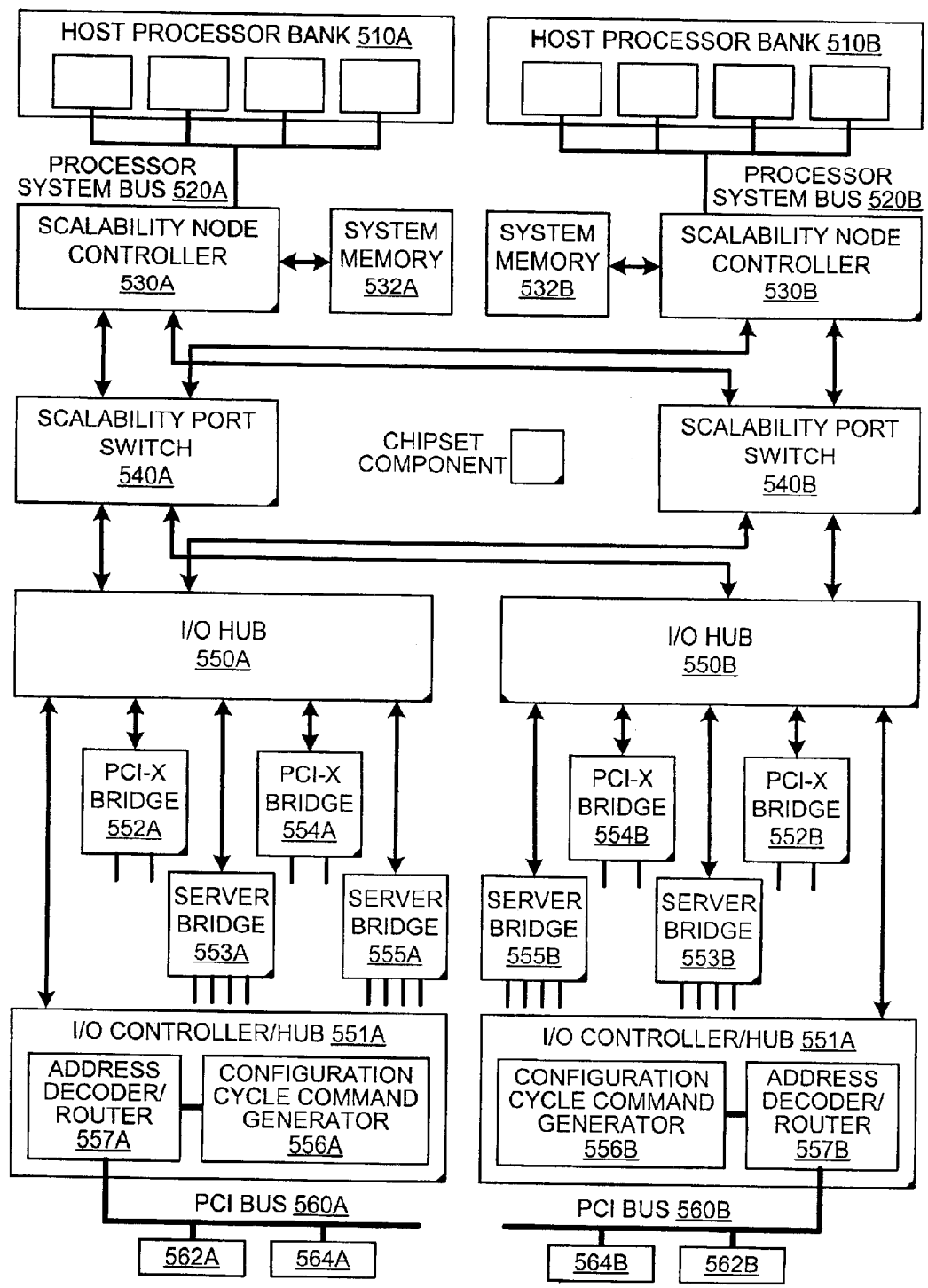

US 6,915,365 B2

MECHANISM FOR PCI I/O-INITIATED CONFIGURATION CYCLES

FIELD OF THE INVENTION

This present invention relates generally to computers having components with Peripheral Component Interconnect (PCI)-compatible configuration registers, and more particularly to methods and apparatus for accessing PCI-compatible configuration registers from an agent attached to a PCI bus.

BACKGROUND OF THE INVENTION

FIG. 1 shows a simplified block diagram for a computer system 20. Host processor 30 is, e.g., a microprocessor, digital signal processor, or an array of such processors. Host processor 30 connects to chipset 40 by front-side bus FSB. Chipset 40 also connects to: system memory 50 via memory bus 52; PCI peripherals 60 via PCI bus 62; a variety of I/O and/or data storage devices (not shown) via interfaces to I/O ports 70; and a graphics subsystem 80 (optional) via an Accelerated Graphics Port (AGP) bus 82. Chipset 40 may comprise a single integrated circuit or a number of separate but interconnected bridge, adapter, hub, and/or interface circuits, depending on the type and capabilities of computer system 20. Generally, however, the purpose of chipset 40 is to connect peripherals to host processor 30 and effect efficient data transactions to, from, and between its attached peripherals without burdening host processor 30 any more than necessary.

FIG. 2 shows some elements of computer system 20 in more detail. Within chipset 40, several blocks are shown. Host interface 42, memory controller 44, I/O interface 45, graphics interface 46, and PCI controller 48 communicate with their respective attached devices according to protocols, timing, and signaling understood by those attached devices. Within chipset 40, those interfaces and controllers intercommunicate in order to bridge data transactions between one interface and another interface.

Computer system 20 has a finite addressable data space that is shared by all addressable components of the system. Address decoders 43 and 49 examine transaction addresses generated by the host processor, graphics subsystem, or PCI subsystem, and then route each corresponding transaction to the addressable component assigned to that address range. For instance, physical memory may be mapped to addresses from 0 up to 2 GB (Gigabytes), the graphics subsystem may use addresses between 2 GB and 3 GB, and addresses between 3 GB and 4 GB may be allocated to PCI controller 48 and its attached peripherals. When the host issues an address, address decoder 43 compares it to these address ranges and then routes the address and corresponding host command appropriately (e.g., to memory controller 44 for addresses below 2 GB).

Chipset 40 typically maintains a set of chipset configuration registers 41 in a specific addressable location. Configuration instructions executed by host processor 30 read these configuration registers to learn and/or set the capabilities of computer system 20.

PCI controller 48 functions as a PCI-to-host bridge, and conforms to the *PCI Local Bus Specification*, Rev. 2.3, Oct. 31, 2001. Below controller 48, PCI BUS1 connects to PCI agents 120, 100, and 110, which have been enumerated as devices DEV1, DEV2, and DEV3. PCI agent 100 is a simple single-function device; PCI agent 110 is a multifunction device; and PCI-PCI bridge 120 provides a connection path between PCI BUS1 and PCI BUS2.

PCI bridge 120 conforms to the *PCI-to-PCI Bridge Architecture Specification*, Rev. 1.1, Dec. 18, 1998, which describes the behavior of a device connecting two PCI buses. Bridge 120 has a primary interface and a secondary interface. The primary interface connects to the PCI bus closest to the host (PCI BUS1); the secondary interface connects to the PCI bus further from the host. Bridge 120 is said to forward a transaction upstream when that transaction flows from the secondary to the primary interface, and downstream when that transaction flows in the opposite direction.

Each device attached to a PCI bus is required to have a PCI-defined configuration register, e.g., device CREG 101, 121, 131, 141. Multifunction devices have a configuration register for each function, e.g., FO CREG 111 and F1 CREG 112. These registers contain information useful for plug-and-play systems, and have some configurable elements used, e.g., to assign an addressable space to each device and set its behavior.

PCI controller 48 can access configuration registers in each PCI agent by placing a configuration read or write command on the bus. A type 0 configuration transaction, shown in FIG. 3a, can be issued to any device attached to PCI BUS1. The target device responds by allowing access to the Function Number, Register Number specified in the transaction address. A type 1 configuration transaction, shown in FIG. 3b, must be issued to access an agent located on PCI BUS2. Bridge 120 examines the contents of a type 1 address, and if Bus Number matches its secondary bus number, it converts the command to type 0 and places it on BUS2 to the indicated Device Number. The target device then allows access to the specified Function Number, Register Number. If the command is a configuration read, bridge 120 relays the register contents from the target device back up to controller 48.

Host processors don't typically have special configuration commands available. Therefore, host access to configuration registers relies on two registers in the chipset, CONFIG_ADDRESS register 46 and CONFIG_DATA register 47. To access PCI configuration registers, the host writes data in the format shown in FIG. 3c to CONFIG_ADDRESS. The host then initiates a memory read or write command to the CONFIG_DATA address. This read or write triggers PCI controller 48 to translate the value stored in CONFIG_ADDRESS to a type 0 or type 1 configuration address and begin the appropriate configuration cycle. FIG. 4 shows, for CONFIG_ADDRESS defined at address 0xCF8 (where 0x indicates hexadecimal notation) and CONFIG_DATA defined at address 0xCFC, how chipset 40 functions to allow a host to access PCI configuration registers.

BRIEF DESCRIPTION OF THE DRAWINGS

The invention may be best understood by reading the disclosure with reference to the drawing, wherein:

FIGS. 3a, 3b, and 3c show data structures used for PCI configuration cycles;

FIG. 11 contains a block diagram for a second distributed chipset architecture according to an embodiment of the invention.

DETAILED DESCRIPTION OF THE EMBODIMENTS

Figure 1:
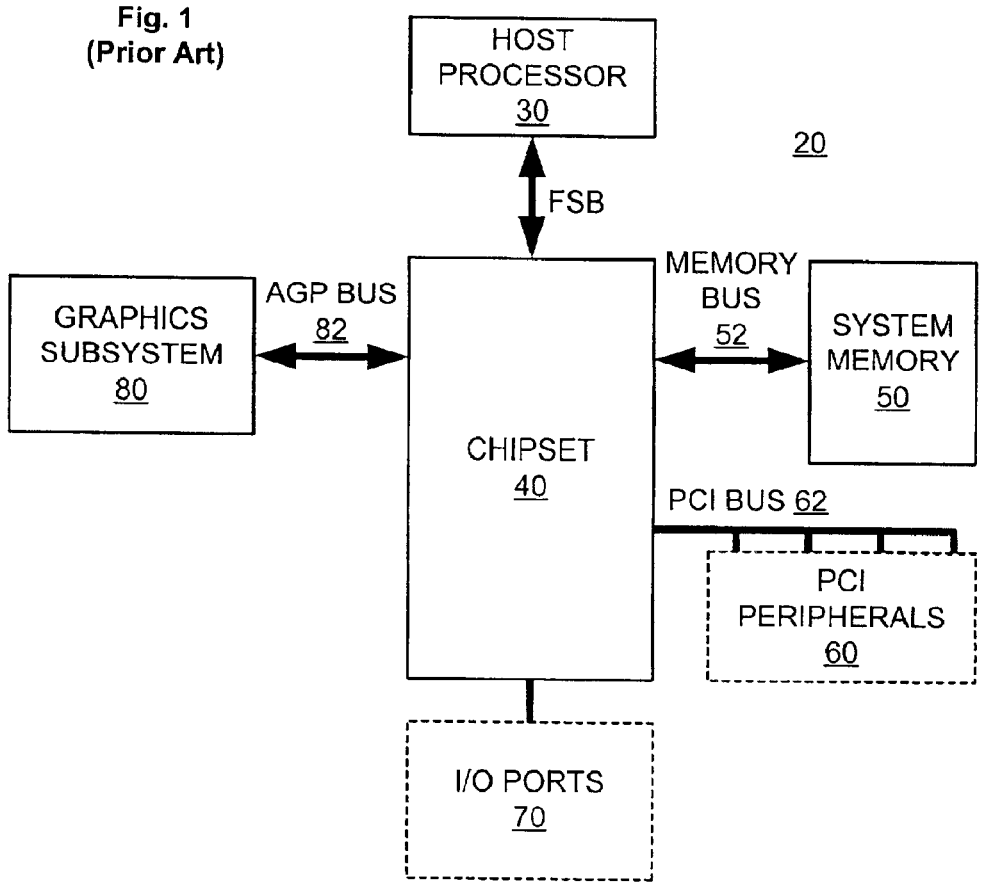
FIG. 1 contains a block diagram for a prior art computer system.
Figure 2:
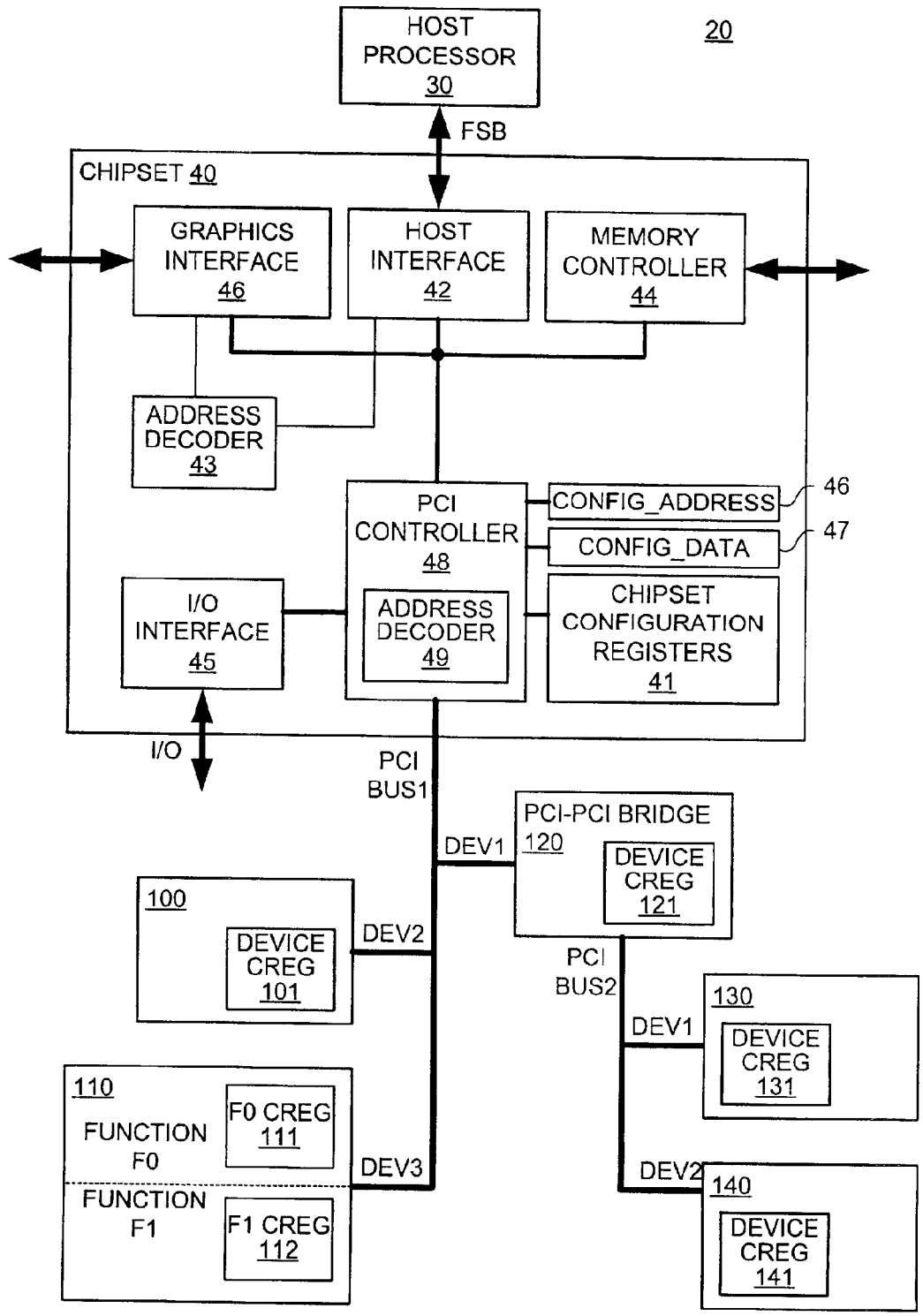
FIG. 2 shows some blocks of FIG. 1 in more detail.
Figure 4:
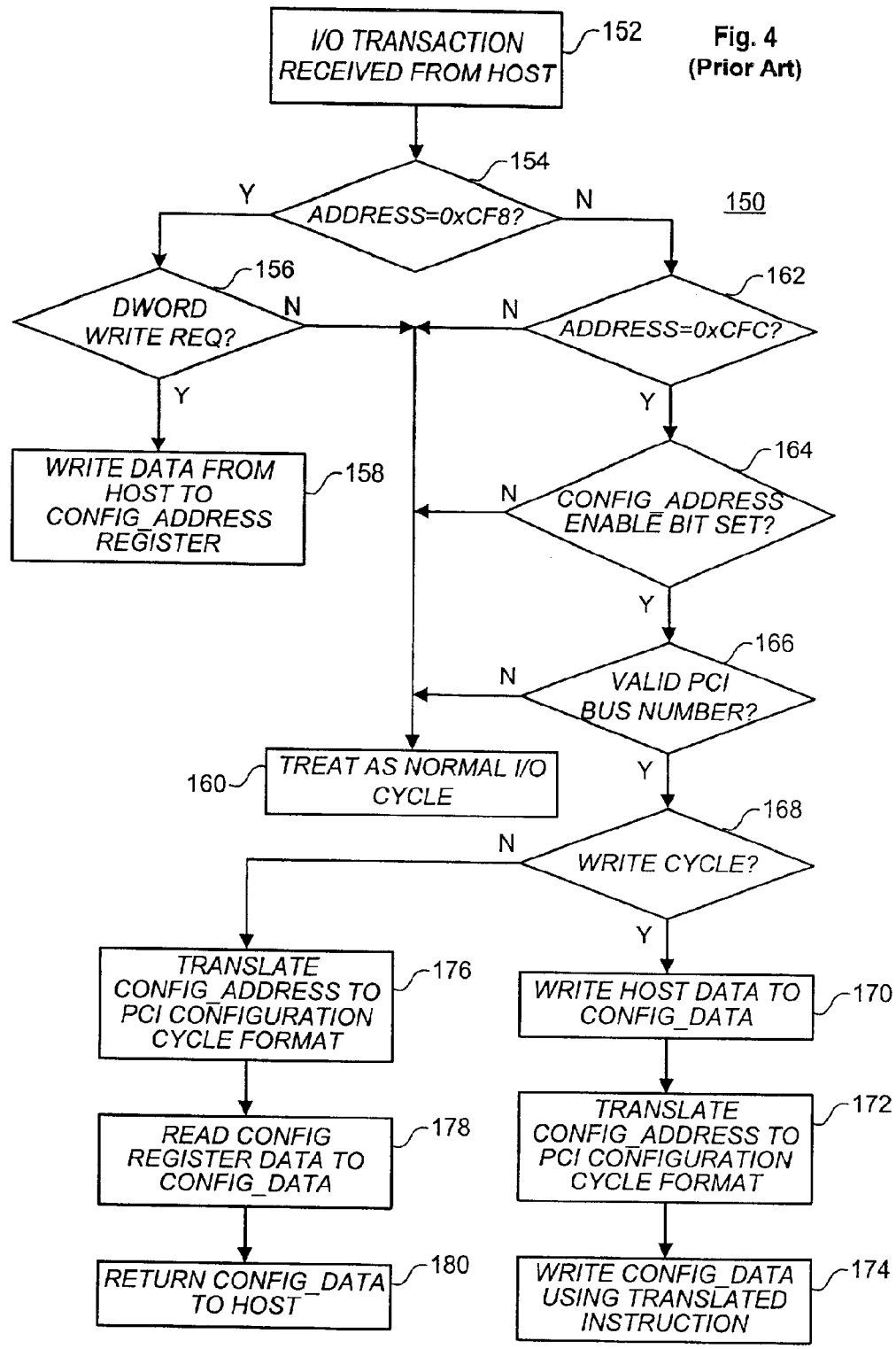
FIG. 4 contains a flow chart indicating how a chipset processes configuration cycles for its host processor.

The PCI local bus was intended to allow downstream configuration register access, i.e., from host processor 30 and PCI controller 48 of FIG. 2. Upstream configuration register access capability is, on the other hand, virtually non-existent for PCI-compliant devices. According to the *PCI-to-PCI Bridge Architecture Specification*, a bridge is to ignore the following appearing at its secondary interface: all type 0 configuration transactions, whether read or write; all type 1 configuration read transactions; all type 1 configuration write transactions, unless used to trigger a "special cycle" upstream (special cycles do not access configuration registers). Thus it is not possible for a bus agent to access configuration registers upstream of the PCI bus that the agent is attached to. And it is not possible for that agent to access chipset configuration registers that exist in configuration address space, or configuration registers on a separate PCI bus that does not share the same PCI root controller.

The disclosed embodiments overcome the inability of PCI to service upstream, or "inbound" configuration cycles, preferably while remaining completely compliant with the relevant PCI specifications. For instance, in a preferred method, a PCI agent signals the chipset to perform a configuration cycle for the agent; the signaling involves accessing predefined memory addresses, allocated to the chipset, with standard PCI memory read and write operations. The chipset is specially configured to recognize accesses to those addresses as requests to perform a configuration on behalf of a device downstream of the chip set. The chipset can always perform the requested cycle, since downstream configuration cycles are supported by PCI, and since it can access its own configuration registers. If the requested configuration transaction is a register write, the chipset performs a configuration write command for the PCI agent. If the requested configuration transaction is a register read, the chipset may instruct the PCI agent to retry its memory read later. The chipset then performs a configuration read command from the requested target configuration register, holds the results in a register, and waits for the agent to retry its original memory read, at which point it supplies the held register data to the agent.

As disclosed below, allowing a PCI bus agent the capability to access platform-wide configuration registers has now been found to be desirable, particularly for complex platforms such as servers. For instance, a validation host can be connected to a system under test by interfacing the validation host and tested system through a PCI card inserted in the tested system. System validation can then access platform configuration space through the PCI card, even if a host processor is not operating in the tested system.

Another use of the disclosed inbound configuration cycle capability is for platform management, e.g., through a custom PCI card. A complex server can use a platform management PCI card to respond, e.g., to error information stored by system components in their configuration registers, thus freeing the server's high-speed processors from the burden of this low-speed administrative task.

Figure 5:
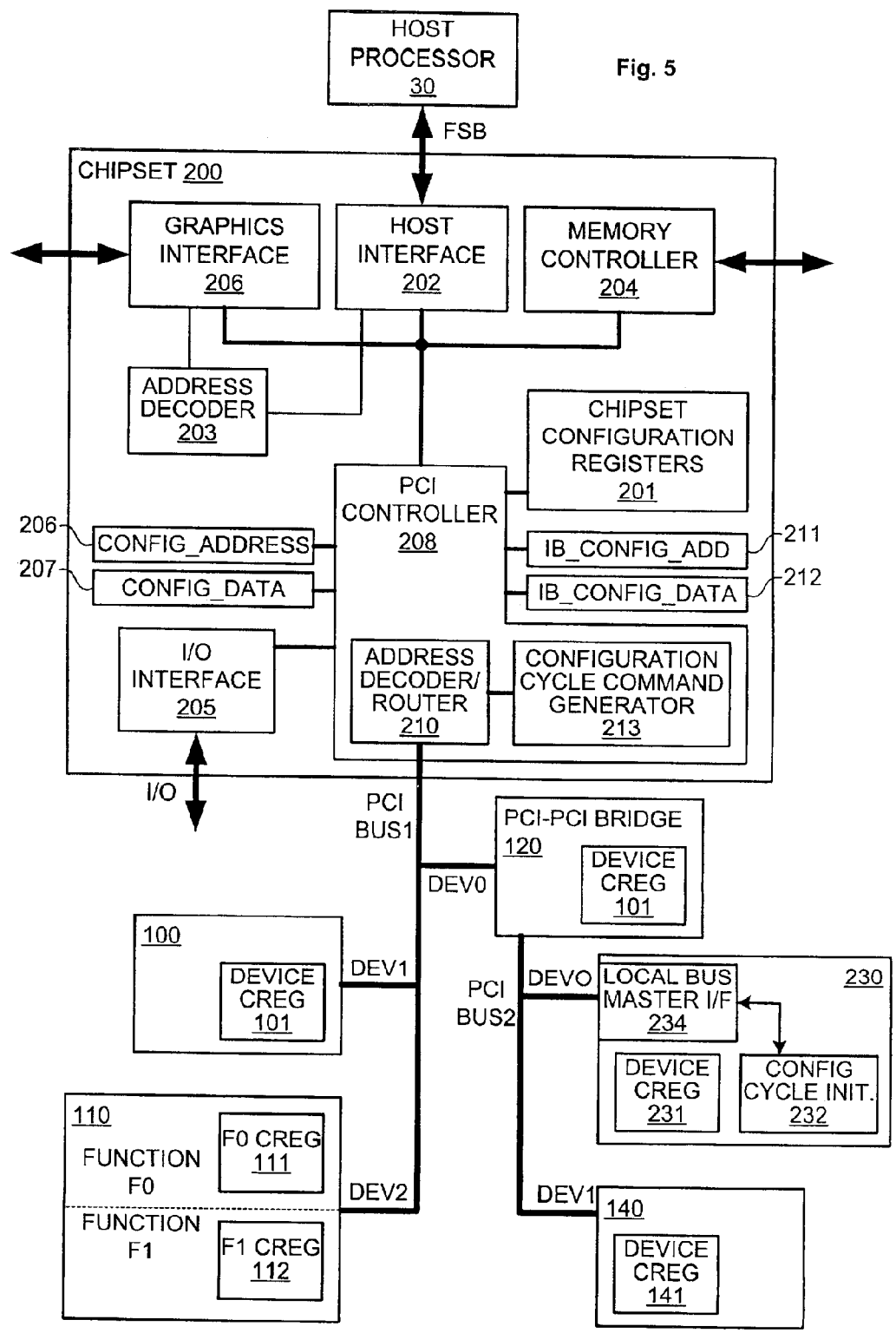
FIG. 5 contains a block diagram for a computer system according to an embodiment of the present invention.

FIG. 5 illustrates a first chipset comprising an embodiment of the invention. To support this embodiment, chipset 200 includes two new registers, IB_CONFIG_ADD register 211 and IB_CONFIG_DATA register 212, and PCI controller 208 includes an address decoder/router 210 and a configuration cycle command generator 213. PCI device 230 includes a configuration cycle initiator 232. The functionality associated with each of these components is illustrated with reference to FIGS. 6 and 7.

Figure 6:
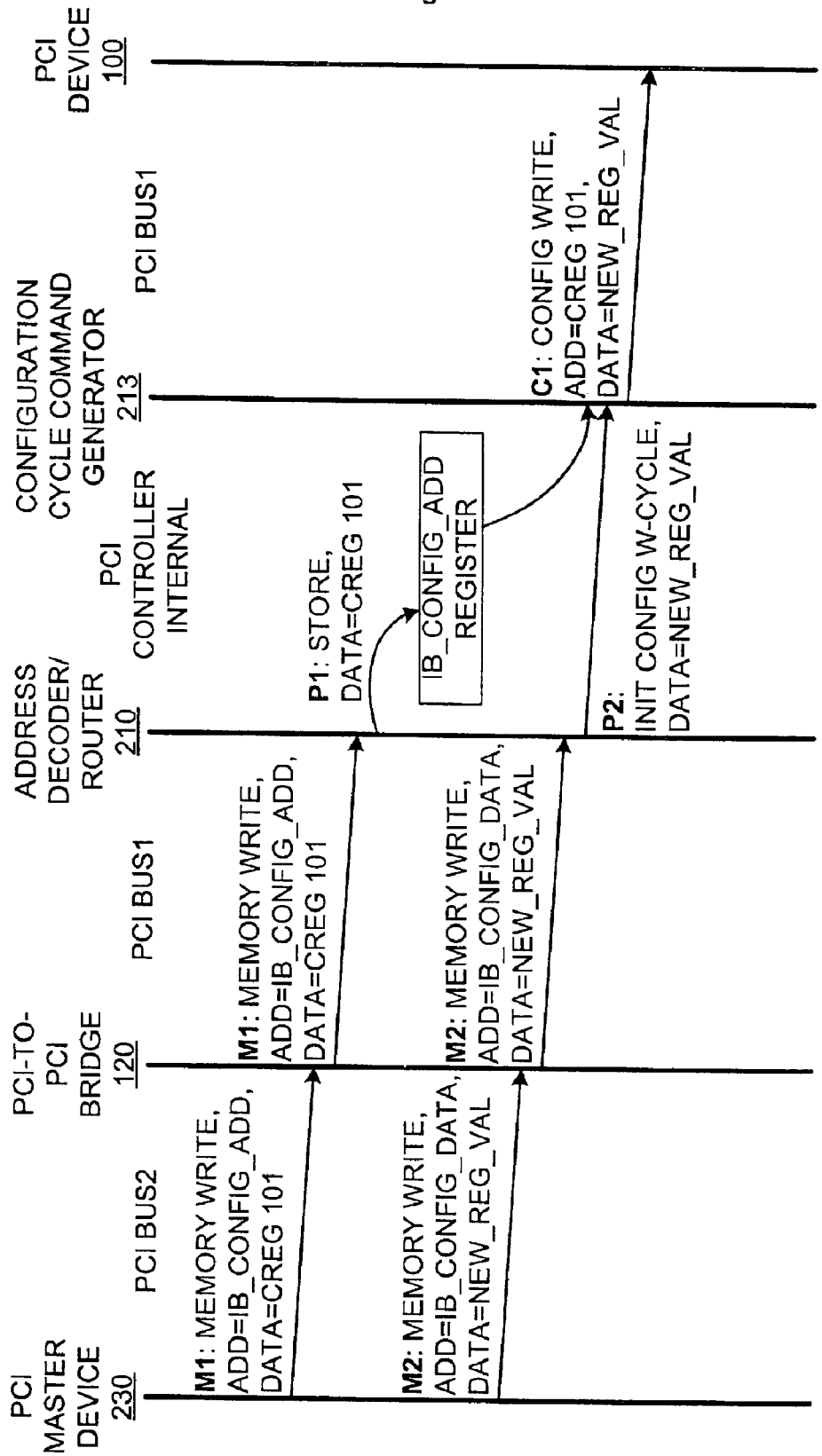
FIG. 6 illustrates bus transaction sequencing for a PCI-bus-agent-initiated configuration write cycle according to one embodiment of the invention.

FIG. 6 contains a transaction diagram for an inbound configuration write cycle, initiated by device 230 as a bus master. For the purposes of this illustration, details such as PCI bus arbitration, master and target bus timing, etc., follow conventional practice and therefore have been omitted for clarity. In this example, PCI device 230, on PCI BUS2, is tasked with writing a new register value NEW_REG_VAL to configuration register 101 in PCI device 100 on PCI BUS1. Configuration cycle initiator 232 is instructed to perform this configuration cycle.

Configuration cycle initiator 232 converts the configuration cycle request to two local bus memory write commands M1 and M2. The address for M1 is the predefined memory address corresponding to inbound configuration address register 211, and the address for M2 is the predefined memory address corresponding to inbound configuration data register 212. Preferably, these addresses exist within a memory area mapped to the chipset (one embodiment uses addressed selected from within a chipset-specific address space reserved between 0xFE00_0000 and 0xFEC0_0000). The write data for command M1 indicates the targeted configuration register, in this case CREG 101. Preferably, the data format for M1 conforms to the format defined for a host configuration access (see FIG. 3c). The data format for M2 is whatever format is required for the targeted configuration register, as M2 contains the new register value to be written.

Configuration cycle initiator 232 instructs local bus master interface 234 to access PCI BUS2 and transmit M1. Bus master interface 234, after being granted the bus, drives a Memory Write command, along with the address IB_CONFIG_ADD, onto PCI BUS2 during a write command address phase. Bridge 120 receives IB_CONFIG_ADD, compares it to its memory-mapped I/O base and limit register settings, and discovers that IB_CONFIG_ADD is not within the memory range assigned downstream of bridge 120. Therefore, bridge 120 discovers that it should forward M1 upstream from its secondary interface to its primary interface on PCI BUS1. Bridge 120 asserts device select to claim M1, and after appropriate handshaking, receives data (encoded CREG 101 address data) during a single data phase from device 230.

At some point after bridge 120 begins to receive M1 at its secondary interface, it requests and is granted access to PCI BUS1 on its primary interface. Bridge 120 then redrives M1 onto PCI BUS1, much the same way device 230 originally drove M1 onto PCI BUS2. PCI controller 208 in chipset 200 receives IB_CONFIG_ADD and discovers that this address is not within the memory range assigned downstream of controller 208. Controller 208 asserts device select to claim M1, and after appropriate handshaking, receives data during a single data phase from bridge 120.

Internal to PCI controller 210, address decoder/router 210 recognizes that M1 is directed to the particular memory address assigned to inbound configuration address register 211. Accordingly, decoder/router 210 captures the data for M1 and latches it into address register 211 with an internal command P1.

Meanwhile, PCI master device 230 either still owns or is regranted PCI BUS2, and at some point drives memory write command M2 onto PCI BUS2. Through a sequence of steps similar to those detailed above for M1, M2 is forwarded through bridge 120 to chipset 200. Address decoder/router 210 recognizes that M2 is directed to the particular memory address assigned to inbound configuration data register 212. Accordingly, decoder/router 210 captures the data for M2, and initiates an internal command P2 to route the data and/or a signal to configuration cycle command generator 213. Command P2 instructs command generator 213 to initiate a configuration write cycle.

Configuration cycle command generator 213 retrieves the contents of inbound configuration address register 211 and converts them to an appropriate PCI configuration cycle transaction type—in this case type 0, since the bus number is the bus directly below controller 208. (Note that a type 1 transaction would be appropriate if the target register resided on a PCI BUS2 device—including the initiating device 230. Note also that an internal transaction would be appropriate if the target register was one of chipset configuration registers 201.) Command generator 213 instructs controller 208's bus sequencer to perform a configuration write, and supplies the address in type 0 format and the new register value as the configuration write data. A standard configuration write transaction C1 then transfers NEW_REG_VAL to CREG 101 in PCI target device 100.

Figure 7:
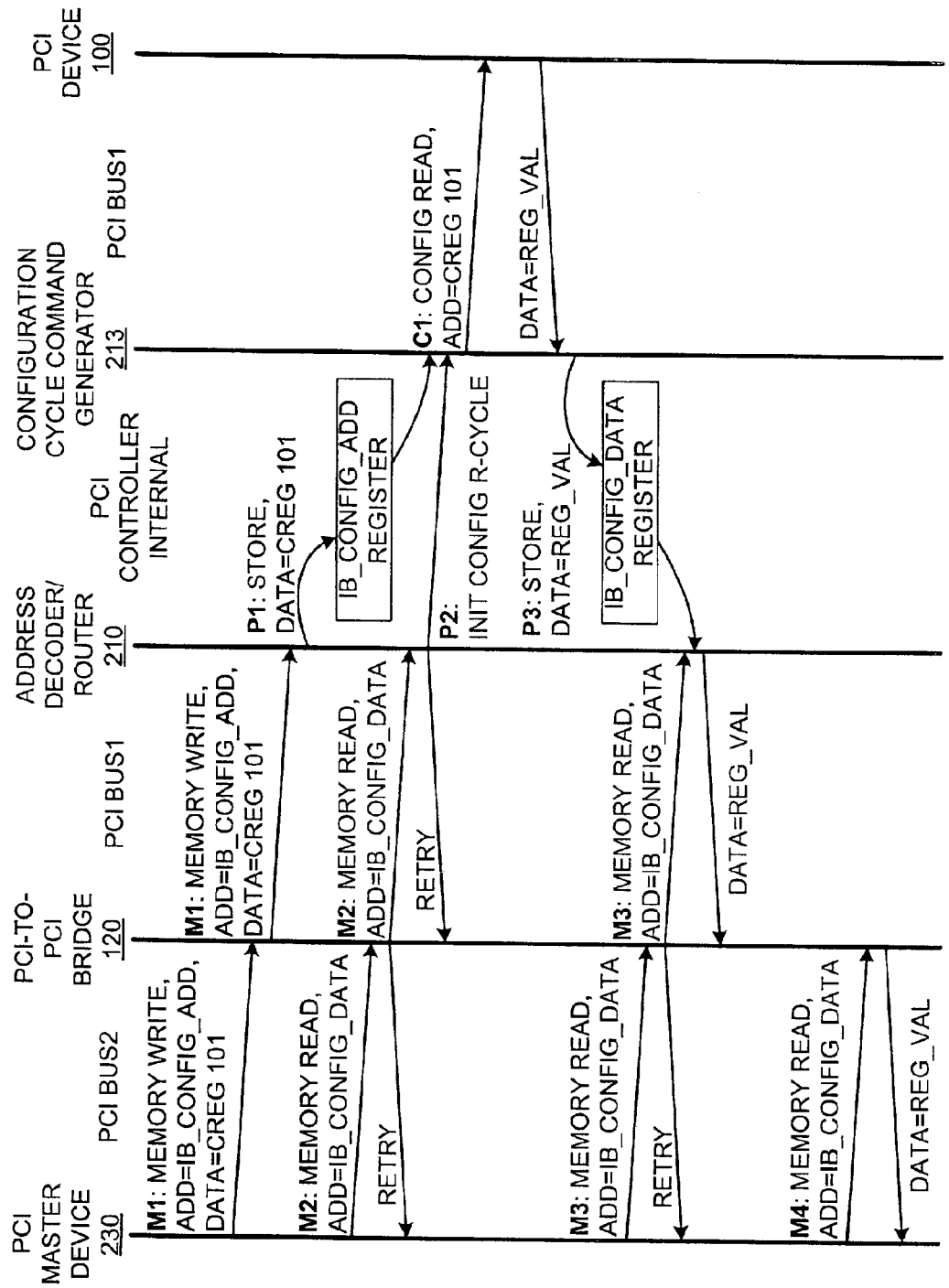
FIG. 7 illustrates bus transaction sequencing for a PCI-bus-agent-initiated configuration read cycle according to one embodiment of the invention.

FIG. 7 contains a transaction diagram for an inbound configuration read cycle, initiated by device 230 as a bus master. Although similar to the inbound configuration write cycle of FIG. 6, differences exist since data must find its way back to device 230 from the target device 100.

As in FIG. 6, configuration cycle initiator 232 begins in FIG. 7 by splitting a configuration read transaction into two PCI memory access commands, Memory Write command M1 and Memory Read command M2. M1 propagates just as in the prior example, on PCI BUS2, through bridge 120, PCI BUS1, and decoder/router 210 to register 211. M2, being a read command instead of a write command, is handled somewhat differently.

M2 is recognized by bridge 120 as having an address that must be forwarded upstream. Bridge 120 forwards M2 onto BUS1. Since bridge 120 has no data (yet) to supply as a response to the read command, bridge 120 instructs device 230 to Retry M2 later. Typically, local bus master interface 234 will contain a state machine that will save M2 and retry the command later, until a more definitive result is achieved. In the meantime, device 230 can release BUS2 so that other devices can use the bus.

Chipset 200's PCI controller 208 accepts Memory Read command M2 from bridge 120. Address decoder/router 210 examines inbound configuration data register 212 and determines that no valid data yet exists for transfer back to bridge 120, and therefore instructs bridge 120 to retry its command later. Decoder/router 210 can make this determination in several ways—one is to deassert a valid data flag bit each time the IB_CONFIG_ADD register is re-loaded or the IB_CONFIG_DATA register is read. The valid data flag bit is asserted only after IB_CONFIG_DATA has been written to.

Since the valid data flag is deasserted, address decoder/router 210 signals configuration cycle command generator 213 to initiate a configuration read cycle. Command generator 213 reads the configuration register address information stored in IB_CONFIG_ADDR register 211 and converts it to an appropriate configuration transaction address phase format, in this case Type 0. Command generator 213 instructs controller 208's bus sequencer to perform a Configuration Read, and supplies the address in type 0 format. A standard configuration read transaction C1 causes device 100 to read its current register CREG 101 value (REG_VAL), and transfer REG_VAL back to PCI controller 208 during the single data phase of C1. Configuration cycle command generator 213 stores REG_VAL in IB_CONFIG_DATA register 212 and asserts the valid data flag.

At some point, device 230 retries its original Memory Read command as command M3, causing bridge 120 to also retry the command (it is possible that bridge 120 will have already retried the Memory Read command on its own). Bridge 120 still has no data for device 230, and thus tells device 230 to Retry later. When bridge 120 drives M3 after valid data has been transferred to the IB_CONFIG_DATA register, address decoder/router 210 responds to M3 by deasserting the valid data flag and returning REG_VAL to bridge 120 during a single data phase. Bridge 120 buffers REG_VAL and waits for device 230 to retry its Memory Read command.

Finally, device 230 retries the Memory Read command as command M4. Bridge 120 responds by supplying REG_VAL to device 230 during a single data phase.

Figure 8:
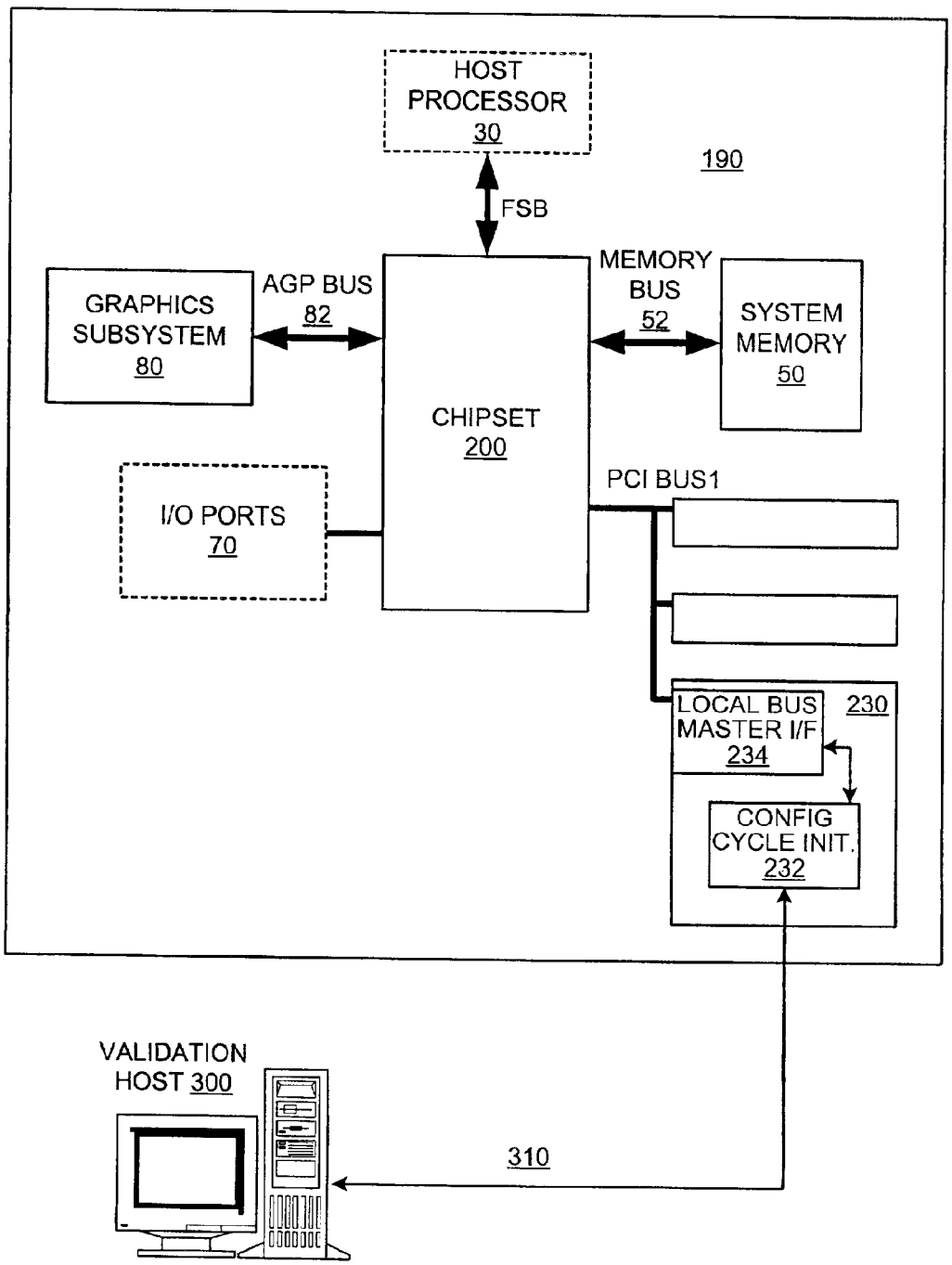
FIG. 8 contains a block diagram illustrating how a second computer system connects to a first computer system to access the first computer system's configuration registers according to an embodiment of the invention.

FIG. 8 illustrates one equipment configuration that uses inbound configuration cycles as described above. Two computer systems, 190 and 300, are shown. System 190 contains a chipset 200 capable of supporting inbound configuration cycles. Local bus card 230 is inserted in a bus slot on a PCI bus (BUS1) of system 190. A communication link 310 connects local bus card 230 to validation host 300.

Through local bus card 230, validation host 300 has full access to the platform configuration registers of system 190, including any registers in chipset 200, the AGP graphics subsystem 80, and all PCI bus agents. Validation host 300 can use this capability to write configuration values to the system 190 platform, whether or not host processor 30 is present and/or operating. Validation host 300 can also exercise the platform and read configuration values to verify the correct operation of the platform under test conditions.

To use the inbound configuration cycle capability, validation host 300 instructs configuration cycle initiator 232 to supply requests to chipset 200 to access platform configuration registers. Configuration cycle initiator uses Memory Write and Read commands to specific memory addresses to complete the configuration cycles. The chipset recognizes those addresses as reserved for triggering chipset-initiated configuration cycles.

In the case of a configuration read instruction, the local bus card receives the target register contents during the data phase of a Memory Read transaction. The local bus card is then responsible for forwarding the register contents to the validation host 300.

Figure 9:
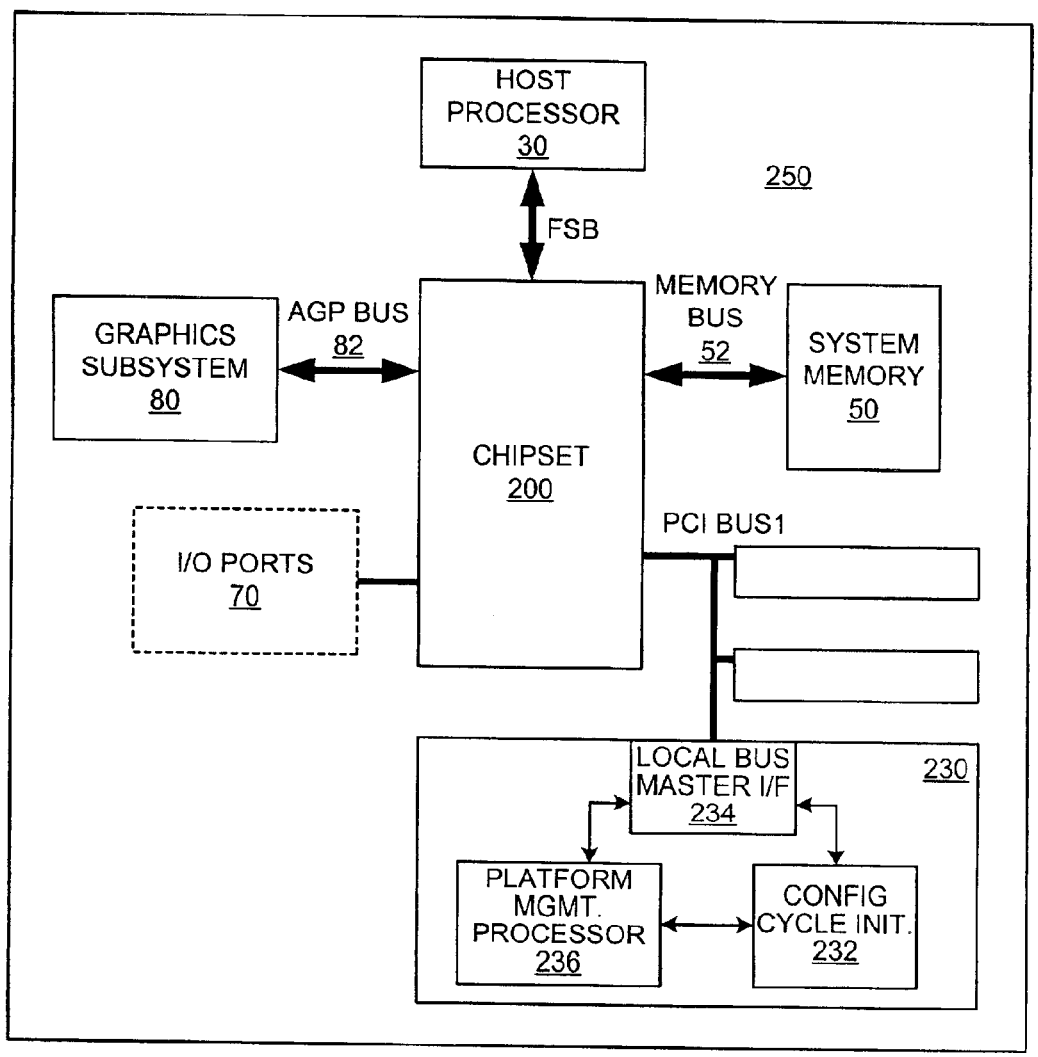
FIG. 9 contains a block diagram illustrating how a platform management card connects to a computer system according to an embodiment of the invention.

FIG. 9 illustrates another equipment configuration that uses inbound configuration cycles as described above. A computer system 250 contains a chipset 200 capable of supporting inbound configuration cycles. Local bus card 230 contains a platform management processor 236. Local bus card 230 is inserted in a bus slot on a PCI bus (BUS1) of computer system 250. Platform management processor 236, operating independent of host processor 30, builds a map of the system platform by issuing inbound configuration cycles. Processor 236 periodically polls the configuration error registers of selected platform components using inbound configuration read cycles as described previously.

Processor 236 evaluates the contents of configuration error registers for error indications. When an affirmative error indication is detected, management processor 236 attempts to reconfigure the computer system. For instance, processor 236 could be programmed to disable or attempt a reset of a malfunctioning component. For some components, an appropriate action may be to interrupt host processor 30, which can then with its interrupt service routine take the appropriate action.

Figure 10:
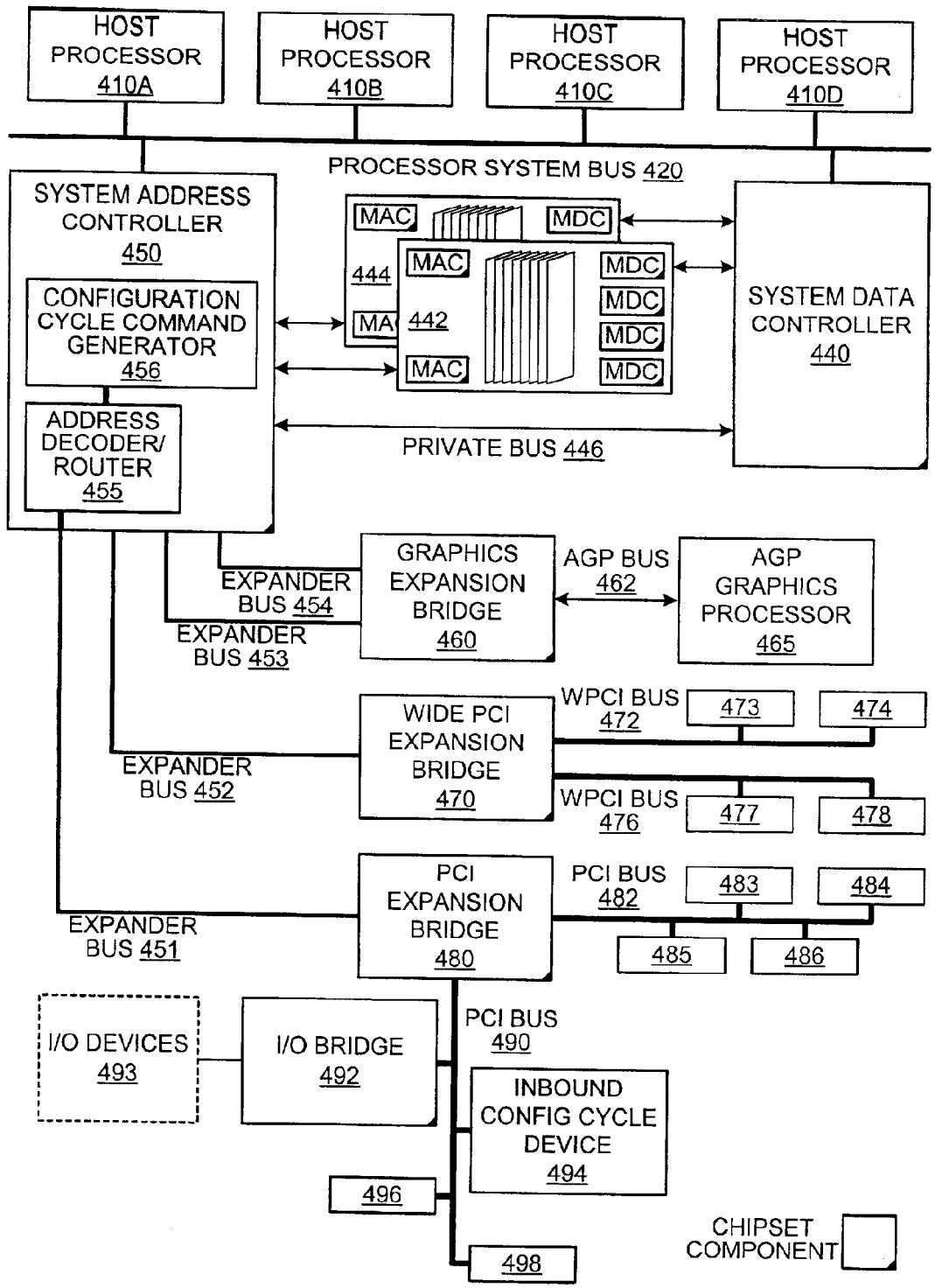
FIG. 10 contains a block diagram for a distributed chipset architecture according to an embodiment of the invention.

Although the preceding embodiments have illustrated relatively simple computer system platforms, other embodiments can be quite complex, such as the multiprocessor server platforms shown in FIGS. 10 and 11. FIG. 10 shows a four-processor platform 400 with a chipset that comprises a system data controller 440, a system address controller 450, memory address controllers (MACs) and memory data controllers (MDCs) on memory cards 442 and 444, a graphics expansion bridge 460, a wide (64-bit) PCI expansion bridge 470, a PCI (32-bit) expansion bridge 480, and an I/O bridge 492. The system can support one or two memory cards, and the graphics expansion and wide PCI expansion bridges are optional (additional PCI expansion bridges can be connected to expander buses 452–54, and or wide PCI expansion bridges can be connected to expander buses 453–54.

System address controller 450 can be considered as the "top" chipset component, as it connects to the system bus and can reach all other chipset components. System address controller (SAC) 450 contains an address decoder/router 455 and configuration cycle command generator 456 similar to those previously described for embodiments of the invention. System address controller 450 uses PCI bus numbers to refer to all chipset components having configuration registers, whether those components actually reside on a PCI bus or on a chipset bus. PCI bus numbering allows host processors 410A–D, as well as inbound configuration cycle device 494, to specify any platform configuration register in PCI format.

Each chipset component has its own set of configuration registers. Preferably, system address controller 450 reserves several PCI bus numbers and device numbers for use in addressing specific platform components. For instance, PCI Bus0 is always serviced by the chipset—device number 0x10 on PCI Bus0 maps to SAC 450. This "device" contains a programmable Chipset Bus Number (CBN), which indicates the bus number used to address all other chipset components. Thus if an inbound configuration cycle device wants to access platform configuration registers for this chipset type, it first reads a configuration value from Bus0, Device 0x10 to discover the CBN. The inbound configuration cycle device can then use the CBN to access configuration registers on each chipset component according to the following table:

| Bus CBN Device Number (hex format) | Device Addressed |
|---|---|
| 00 | System Address Controller |
| 01 | System Address Controller |
| 04 | System Data Controller |
| 05 | Memory Card 442 |
| 06 | Memory Card 444 |
| 10 | Expander on Bus 451, Bus a |
| 11 | Expander on Bus 451, Bus b |
| 12 | Expander on Bus 452, Bus a |
| 13 | Expander on Bus 452, Bus b |
| 14 | Expander on Bus 453, Bus a |
| 15 | Expander on Bus 453, Bus b |
| 16 | Expander on Bus 454, Bus a |
| 17 | Expander on Bus 454, Bus b |
| All others | Reserved |

System address controller 450 uses controller 450 uses chipset connections to service inbound configuration cycles to PCI bus numbers 0 and CBN. For other requested bus numbers, controller 450 uses is internal configuration data to determine which expander bus links to the requested bus number, and forwards configuration cycle commands from generator 456 down the appropriate expander bus to reach the target device. This allows inbound configuration cycle device 494 to access devices on separate PCI buses that are reachable only through system address controller 450.

FIG. 11 illustrates another, even higher-performance computer system 500. As illustrated, system 500 supports two host processor banks 510A and 510B, each having four processors. Each processor bank connects by its own processor system bus (520A and 520B) to its own scalability node controller (530A and 530B). Each node controller also connects to a system memory bank (532A and 532B) serving that controller's processor bank. More (or less) processing resources can be included in the platform, with each processing resource block consisting of a host processor bank, a scalability node controller, and a block of system memory.

Each scalability node controller has two bi-directional high-speed output ports that are used to communicate with I/O subsystems. As shown, the scalability node controllers each connect through both scalability port switches 540A and 540B (which route bus traffic between any of their four ports) to each other and to each other's I/O hub (550A and 550B), allowing the two processing resource blocks to share memory and I/O devices.

Each I/O hub has two upstream ports and five downstream ports, all bi-directional. The upstream ports provide connectivity to scalability port switches, each port supporting communication at 3.2 GBps. Four of the downstream ports are high-speed interfaces operating at 1 GBps. Each can connect to one of several available high-speed bridges. Shown are PCI-X bridges (552A, 554A), each serving two PCI-X (the PCI-X Specification, Rev. 1.0a, describes this higher-performance PCI derivative) buses, and server bridges (553A, 555A), which allow this server platform to interconnect with other servers in a group.

The fifth I/O hub downstream port connects to an I/O controller/hub, e.g., controller/hub 551A. Controller/hub 551A supports ATA (AT Attachment) buses to mass storage devices (not shown), Ethernet ports (not shown), Universal Serial Bus ports (not shown), etc. Controller/hub 551A also supports at least one PCI bus 560A.

Controller/hub 551 contains the functionality needed to support PCI inbound configuration cycles, e.g., an address decoder/router 557A and a configuration cycle command generator 556A. Thus an inbound configuration cycle device can be located at PCI bus slot 562A or 564A, and will have its inbound-configuration-cycle Memory Write and Memory Read commands served by I/O controller/hub 551A. Note that due to the highly interconnected chipset architecture, I/O controller/hub 551A can access configuration registers in any chipset component over the chipset buses, on behalf of a master located on bus 560A.

Platform 500 shows identical hubs, bridges and buses mirrored for both processing resource blocks. It is understood that the platform could have more or less I/O hubs than processing resource blocks, and not every I/O hub need connect to an I/O controller hub. But if more than one I/O controller/hub is present, each I/O controller/hub will support inbound configuration cycles for PCI devices downstream of that controller/hub.

Many other configurations are possible. For instance, multiple inbound configuration cycle devices could be supported in one of several ways that alleviate the confusion that might result if two devices were to attempt to use the inbound configuration cycle service concurrently. One possibility is to lock the inbound configuration address register once it has been written to, until the inbound configuration data register address has been read or written to. This prevents a second device from overwriting the address register before a first device has used the configuration address it stored there.

Another possibility is to provide unique predefined memory addresses for each possible inbound configuration cycle device. For instance, a block of addresses could be reserved within a chipset's addressable space for inbound configuration cycles. Within that block, one sub-block is allocated to configuration address register addresses, and another sub-block is allocated to configuration data register addresses. Each inbound configuration cycle device is assigned a unique address pair within the two sub-blocks. Each unique address comprises a sub-block base address, concatenated with a bit pattern representing that PCI device's bus and device numbers. With such a scheme, the chipset can distinguish and separate inbound configuration cycles coming from different devices, based on the Memory Write or Memory Read address supplied. Of course, the chipset need not reserve separate configuration address and data registers for each possible address; a dynamic mapping table could assign registers from a much smaller pooled register resource to serve the small number of inbound devices that may be active concurrently.

Other modifications are possible. For instance, a "predefined" register address need not be hard coded, as long as the chipset and inbound configuration cycle device have some way of understanding the current register address at the time of its use. One device could use different address pairs, both recognized by the chipset, to initiate two overlapping configuration cycle accesses.

Under some circumstances, as where security it an issue, another optional feature that disables chipset support for inbound configuration cycles (or just inbound write configuration cycles) could be included. For instance, the chipset may support an inbound-configuration-cycle enable bit or bits, which are settable only by the host. When the host disables such bits, inbound configuration cycle Memory Read and Write commands would be aborted. These bits could remain disabled at all times, if a system designer so desired. Alternately, during certain operational phases the host could disable such accesses, e.g., during system startup.

The specific examples that have been presented are applicable to devices and drivers conforming to current PCI standards. It is acknowledged that evolutionary PCI improvements are ongoing, and competing technologies with similar capabilities may also be developed. Accordingly, the scope of the present invention is not limited to current PCI and/or PCI-X implementations, but is intended to extend to any protocol or chipset-addressable device using local bus-style configuration registers. Likewise, uses for inbound configuration cycles—other than those disclosed herein—may be discovered. An inbound configuration cycle service supporting those uses also falls within the scope of the attached claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of operating a computer system having a bus slot in at least one local bus, a chipset, and at least one configuration register addressable by the chipset, the method comprising:

connecting a first bus agent to the local bus via a local bus card inserted in the bus slot;

the bus agent writing first data to a first predefined memory address using a local bus write command, the first data describing the location of the at least one configuration register;

the chipset routing the first data, based on the first predefined memory address, to an inbound configuration address register;

the bus agent initiating a local bus memory access command to a second predefined memory address; and the chipset responding, based on the second predefined memory address, to the memory access command by initiating a configuration cycle using the first data to form a configuration cycle address.

2. The method of claim 1, wherein the local bus memory access command is a memory write command comprising an address phase, supplying the second predefined memory address, and a data phase, supplying data to be written in the at least one configuration register, the chipset initiating a configuration cycle comprising accepting the data supplied during the data phase and writing the accepted data to the at least one configuration register as part of a configuration write cycle issued by the chipset as bus master.

3. The method of claim 1, wherein the local bus memory access command is a memory read command, the chipset responding to the memory read command by:

instructing the bus agent to retry the memory read command later;

initiating the configuration cycle by reading configuration register data from the configuration register indicated in the inbound configuration address register; and holding the read configuration register data and waiting for the bus agent to retry the memory read command.

4. The method of claim 3, further comprising the bus agent retrying the memory read command, and the chipset supplying the read configuration register data to the bus agent in response to the retried memory command.

5. The method of claim 1, wherein the first and second predefined memory addresses exist within a memory area mapped to the chipset, the chipset detecting the presence of the first or second predefined memory addresses in local bus commands by screening those commands for addresses within that memory area.

6. The method of claim 1, wherein the configuration register exists within a component of the chipset, the chipset using its internal data paths to access the at least one configuration register.

7. The method of claim 1, wherein the at least one configuration register exists within a second bus agent on a second local bus separate from the local bus connected to the first bus agent, the chipset initiating a configuration cycle comprising issuing a local bus configuration access command on the second local bus.

8. A method of accessing the platform configuration registers of a first computer system from a second computer system, wherein the first computer system has at least one chipset-connected local bus having at bus slot, the method comprising:
- connecting the second computer system to the first computer system through a local bus card inserted in the bus slot; and
- instructing the local bus card, from the second computer system, to supply a request to the first computer system chipset for access to a platform configuration register, the request comprising issuing local bus memory access commands to specific memory addresses that the chipset recognizes as reserved for triggering chipset-initiated configuration cycles.

9. The method of claim 8, wherein the request for access to a platform configuration register comprises a request to read the contents of a platform configuration register, the method further comprising the local bus card receiving data, in the form of memory read command data, from the chipset, the memory read command data comprising the contents of the platform configuration register, and the local bus card forwarding the data to the second computer system.

10. The method of claim 8, wherein at the time of instructing the local bus card, the platform of the first computer system is powered but not under the control of a first computer system host processor.

11. A method of managing a computer system platform from a management processor separate from the computer system host processor, wherein the computer system has at least one chipset-connected local bus having a bus slot, the method comprising:
- interfacing the management processor with the computer system platform through a local bus card inserted in the bus slot; and
- operating the local bus card as a bus master to supply a request to the computer system chipset for access to a platform configuration register, the request comprising issuing local bus memory access commands to specific memory addresses that the chipset recognizes as reserved for triggering chipset-initiated configuration cycles.

12. The method of claim 11, wherein operating the local bus card as a bus master comprises the management processor periodically requesting that the chipset supply, through the local bus card, the contents of a set of platform configuration registers capable of storing platform error information.

13. The method of claim 12, wherein when the chipset supplies the contents of a platform configuration register capable of storing platform error information, the method further comprises the management processor evaluating those contents for error indications, and responding to an affirmative error indication by attempting to reconfigure the computer system.

14. The method of claim 13, wherein attempting to reconfigure the computer system comprises disabling an input/output subsystem of the platform.

15. The method of claim 13, wherein attempting to reconfigure the computer system comprises interrupting a computer system host processor to respond to the error.

16. A computer chipset comprising:
- a local bus controller to interface with local bus agents connected to the controller through at least one local bus connection point;
- an inbound configuration address register to store addressing information for a configuration cycle;
- a configuration cycle command generator capable of initiating a configuration cycle, the configuration cycle targeting a configuration register specified by the contents of the inbound configuration address register; and
- an address decoder/router to decode command addresses received from local bus agents through the local bus controller, the decoder having the capability to recognize a memory write command with a first memory address as a write to the inbound configuration address register and route write command data to that register, the decoder having the capability to recognize a memory access command with a second memory address as a request for the chipset to perform a configuration cycle, and route a signal to the configuration cycle command generator to initiate a configuration cycle, said local bus controller, inbound configuration address register, configuration cycle command generator, and address decoder/router intergrated in a first circuit, the chipset comprising at least two instances of the first circuit, each capable of interfacing as claimed with local bus agents connected to that circuit local bus controller.

17. The chipset of claim 16, comprising multiple interconnectable chipset integrated circuits, each having a configuration register set, the configuration cycle command generator capable of accessing the configuration register set of an integrated circuit, other than the circuit upon which that command generator is integrated, during a configuration cycle requested through the address decoder/router.

18. The chipset of claim 17, wherein, for each chipset integrated circuit including a configuration register set, that register set is addressable using configuration addresses compatible with local bus configuration register set addressing.

19. The chipset of claim 16, further comprising an inbound configuration data register capable of holding data associated with the second memory address, the chipset capable of storing, in the inbound configuration data register, data supplied as a result of a configuration road cycle initiated by the configuration cycle command generator.

20. The chipset of claim 19, the address decoder/router having the capability to recognize a retry of a memory read command to the second memory address, and cause the local bus controller to supply, on the local bus and as the result of the retried memory read command, data held in the inbound configuration data register.

21. The chipset of claim 16, each instance of the first circuit having the capability to initiate configuration cycles to local bus agents connected to another instance of the first circuit.

22. A computer system comprising
at least one local bus capable of supporting multiple bus agents on at least one local bus card;
at least one bus slot in said local bus, said local bus card being received in said slot; and
a chipset connected to the at least one local bus, having the capability to:
  detect a memory access command initiated by a bus agent on said local bus card to a predefined memory address as a request to perform a configuration cycle on behalf of that bus agent; and
  perform the requested configuration cycle on behalf of that bus agent.

23. The computer system of claim 22, wherein the at least one local bus comprises at least two disjoint local buses, the chipset having the capability to execute a configuration cycle on one local bus at the request of a bus agent on the other local bus.

24. The computer system of claim 22, wherein the chipset comprises multiple interconnected integrated circuits each having a configuration register set, the chipset having the capability to execute a configuration cycle to a configuration register set on any of the multiple interconnected integrated circuits on behalf of the bus agent.

25. A local bus card comprising:
a local bus master interface; and
a configuration cycle initiator capable of converting a local bus configuration access command to at least two local bus memory access commands, the first command utilizing the bus master interface to perform a memory write to a first predefined memory address, the memory write data encoding a configuration register address description for the local bus configuration access command, the second command utilizing the bus master interface to perform a memory access to a second predefined memory address.

26. The local bus card of claim 25, the configuration cycle initiator capable of causing the local bus master interface to supply to an attached local bus, when the configuration access command is a configuration write command, configuration register write data during the data phase of the second command.

27. The local bus card of claim 25, the configuration cycle initiator capable of returning, when the configuration access command is a configuration read command, data received by the local bus master interface from the attached local bus during the data phase of the second command, as the results of the configuration access command.

* * * * *